(12) United States Patent
Wang

(10) Patent No.: US 10,705,751 B2
(45) Date of Patent: Jul. 7, 2020

(54) METHOD AND DEVICE FOR PROCESSING DATA

(71) Applicant: Beijing Xiaomi Mobile Software Co., LTD., Beijing (CN)

(72) Inventor: Ke Wang, Beijing (CN)

(73) Assignee: Beijing Xiaomi Mobile Software Co., LTD., Beijing (CN)

( * ) Notice: Subject to any disclaimer, the term of this patent is extended or adjusted under 35 U.S.C. 154(b) by 0 days.

(21) Appl. No.: 15/951,250

(22) Filed: Apr. 12, 2018

(65) Prior Publication Data
US 2018/0307436 A1 Oct. 25, 2018

(30) Foreign Application Priority Data

Apr. 25, 2017 (CN) .......................... 2017 1 0276993

(51) Int. Cl.
*G06F 3/06* (2006.01)
*H04L 29/08* (2006.01)

(52) U.S. Cl.
CPC .......... *G06F 3/0647* (2013.01); *G06F 3/0604* (2013.01); *G06F 3/067* (2013.01);
(Continued)

(58) Field of Classification Search
CPC .... G06F 3/0647; G06F 3/0673; G06F 3/0604; G06F 3/067; G06F 3/0608; H04L 67/1097
See application file for complete search history.

(56) References Cited

U.S. PATENT DOCUMENTS

| 8,458,363 | B2 * | 6/2013 | Rosenblatt | .............. | G06F 3/017 |
| | | | | | 709/248 |
| 9,258,299 | B2 * | 2/2016 | Derek | ................. | H04L 63/0861 |

(Continued)

FOREIGN PATENT DOCUMENTS

| CN | 104731530 A | 6/2015 |
| CN | 106294188 A | 1/2017 |

(Continued)

OTHER PUBLICATIONS

Extended European Search Report dated Sep. 24, 2018 in European Patent Application No. 18167290.8, citing documents AA, AB and AO therein, 11 pages.

(Continued)

*Primary Examiner* — Francisco A Grullon
(74) *Attorney, Agent, or Firm* — Oblon, McClelland, Maier & Neustadt, L.L.P.

(57) ABSTRACT

The disclosure relates to a method and device for processing data. The method includes determining a size of available storage space in a first storage area in a terminal equipment; comparing the size of the available storage space in the first storage area to a first threshold; determining that the size of the available storage space in the first storage area is less than the first threshold; in response to determining that the size of the available storage space in the first storage area is less than the first threshold, determining whether data stored in the first storage area meet a preset condition; determining that the data stored in the first storage area meet the preset condition; and transferring the data that meet the preset condition to a second storage area, wherein the second storage area is different from the first storage area.

12 Claims, 8 Drawing Sheets

(52) U.S. Cl.
CPC .......... *G06F 3/0608* (2013.01); *G06F 3/0673* (2013.01); *H04L 67/1097* (2013.01)

(56) References Cited

U.S. PATENT DOCUMENTS

| | | | |
|---|---|---|---|
| 2007/0106860 A1* | 5/2007 | Foster | G06F 1/3225 711/170 |
| 2011/0307795 A1* | 12/2011 | Guillou | G06F 3/04847 715/738 |
| 2015/0373116 A1 | 12/2015 | Mo et al. | |
| 2016/0192178 A1* | 6/2016 | Blong | G06F 3/067 455/418 |
| 2018/0262570 A1 | 9/2018 | Mo et al. | |

FOREIGN PATENT DOCUMENTS

| | | | |
|---|---|---|---|
| CN | 106528638 A | 3/2017 | |
| CN | 106790581 A | 5/2017 | |
| EP | 2 397 938 A1 | 12/2011 | |

OTHER PUBLICATIONS

Combined Chinese Office Action and Search Report dated Jun. 26, 2019 in Chinese Patent Application No. 201710276993.9 (with English translation), citing documents AO through AR therein, 17 pages.

* cited by examiner

METHOD AND DEVICE FOR PROCESSING DATA

CROSS-REFERENCE TO RELATED APPLICATIONS

This application is based on and claims priority to Chinese Patent Application Serial No. CN 201710276993.9, filed with the State Intellectual Property Office of P. R. China on Apr. 25, 2017, the entire contents of which are incorporated herein by reference.

TECHNICAL FIELD

The present disclosure relates to the field of data processing, and more particularly to a method and device for processing data.

BACKGROUND

In related art, a user may select to transfer data that is local to a terminal equipment to a cloud storage when there is not enough storage space on the terminal equipment. For example, the user may log in to an account at the cloud storage to select a file to be backed up. The terminal equipment uploads the file selected by the user to a specified location in a network hard disk. The user may recover previously uploaded data by logging in to the account at the cloud storage in case the data is lost. At present, the user has to manually select local data to be uploaded to the cloud storage, which is cumbersome, leading to poor experience.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for processing data. The method includes determining a size of available storage space in a first storage area in a terminal equipment; comparing the size of the available storage space in the first storage area to a first threshold; determining that the size of the available storage space in the first storage area is less than the first threshold; in response to determining that the size of the available storage space in the first storage area is less than the first threshold, determining whether data stored in the first storage area meet a preset condition; determining that the data stored in the first storage area meet the preset condition; and transferring the data that meet the preset condition to a second storage area, wherein the second storage area is different from the first storage area.

According to an aspect, when determining whether the data stored in the first storage area that meet the preset condition, the method includes determining a period of time during which the data stored in the first storage area have not been used; comparing the period of time to a second threshold; determining that the period of time is greater than the second threshold; and designating the data stored in the first storage area that meet the preset condition as data stored in the first storage area that have not been used for the period of time that is greater than the second threshold.

According to another aspect, when designating the data stored in the first storage area that meet the preset condition as the data stored in the first storage area that have not been used for the period of time that is greater than the second threshold, the method includes determining a size of the data stored in the first storage area; comparing the size of the data to a third threshold; determining that the size of the data is greater than the third threshold; and designating the data stored in the first storage area that meet the preset condition as the data stored in the first storage area that have not been used for the period of time that is greater than the second threshold and have the size that is greater than the third threshold.

According to yet another aspect, when determining the size of the available storage space in the first storage area, the method includes determining whether the data are to be stored in the first storage area; in response to determining that the data are to be stored in the first storage area, determining the size of the available storage space in the first storage area; and determining a size of the data that are to be stored in the first storage area, wherein the first threshold is the size of the data to be stored in the first storage area.

According to yet another aspect, when transferring the data that meet the preset condition to the second storage area, the method includes determining a data type of the data stored in the first storage area that meet the preset condition; and sequentially transferring the data stored in the first storage area that meet the preset condition to the second storage area in order of descending priorities corresponding to data types until the size of the available storage space in the first storage area reaches the first threshold.

Aspects of the disclosure also provide a device for processing data. The device includes circuitry that is configured to determine a size of available storage space in a first storage area in a terminal equipment; compare the size of the available storage space in the first storage area to a first threshold; determine that the size of the available storage space in the first storage area is less than the first threshold; in response to determining that the size of the available storage space in the first storage area is less than the first threshold, determine whether data stored in the first storage area meet a preset condition; determine that the data stored in the first storage area meet the preset condition; and transfer the data that meet the preset condition to a second storage area, wherein the second storage area is different from the first storage area.

Aspects of the disclosure also provide a device for processing data. The device includes a processor and a memory for storing instructions executable by the processor. The processor is configured to determine a size of available storage space in a first storage area in a terminal equipment; compare the size of the available storage space in the first storage area to a first threshold; determine that the size of the available storage space in the first storage area is less than the first threshold; in response to determining that the size of the available storage space in the first storage area is less than the first threshold, determine whether data stored in the first storage area meet a preset condition; determine that the data stored in the first storage area meet the preset condition; and transfer the data that meet the preset condition to a second storage area, wherein the second storage area is different from the first storage area.

Aspects of the disclosure also provide a non-transitory computer-readable storage medium having stored therein instructions that, when executed by a processor, cause the processor to determine a size of available storage space in a first storage area in a terminal equipment; compare the size of the available storage space in the first storage area to a first threshold; determine that the size of the available storage space in the first storage area is less than the first threshold; in response to determining that the size of the available storage space in the first storage area is less than the first threshold, determine whether data stored in the first storage area meet a preset condition; determine that the data stored in the first storage area meet the preset condition; and transfer the data that meet the preset condition to a second storage area, wherein the second storage area is different from the first storage area.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the disclosure and, together with the description, serve to explain the principles of the disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of illustrative aspects do not represent all implementations consistent with the disclosure. Instead, they are merely examples of apparatuses and methods consistent with aspects related to the disclosure as recited in the appended claims.

Figure 1:
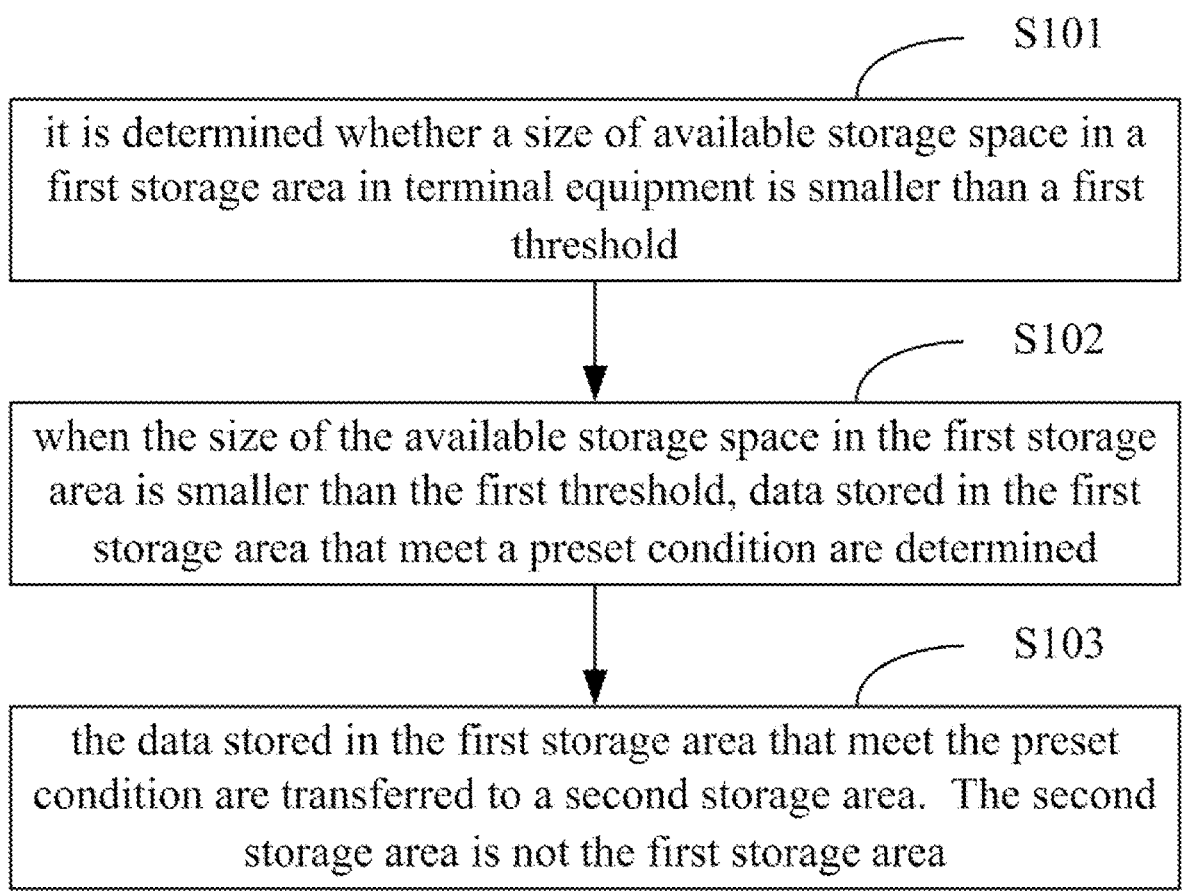
FIG. 1 is a flowchart of a method for processing data according to an exemplary aspect of the present disclosure.

FIG. 1 is a flowchart of a method for processing data according to an exemplary aspect. The method for processing data may apply to terminal equipment such as a mobile phone, a computer, etc. As shown in FIG. 1, the method for processing data includes steps as follows.

In step S101, it is determined whether a size of available storage space in a first storage area in terminal equipment is smaller than a first threshold.

The first storage area may be some or all storage areas in memory of the terminal equipment. The memory may refer to memory equipment in the terminal equipment for storing information, such as a memory built in or external to the terminal equipment, etc. The memory may store various types of data, such as, but not limited to, a picture file, a video file, a text file, an executable file, etc. For example, the first storage area may refer to whole storage area, or a disk C or E, of a computer. The present disclosure is not limited thereto.

The available storage space in the first storage area may refer to a storage space in the first storage area that is available for use. In an example, the size of the available storage space in the first storage area may be determined according to the size of the first storage area and the size of the space in the first storage area that has been used or occupied. For example, if the size of the first storage area is 64 GB, of which 62 GB has been used, then the size of the available storage space in the first storage area is 2 GB.

In a possible mode of implementation, the first threshold may be a preset numerical value, such as 800M, 2G, and/or the like.

In an example, it may be determined in step S101, whether the size of available storage space in the first storage area in the terminal equipment is smaller than the first threshold, as follows. The terminal equipment may determine, at a first interval, the size of the available storage space in the first storage area, and determine whether the size of the available storage space in the first storage area is smaller than the first threshold.

The size of the available storage space in a specified storage area in the terminal equipment may be detected automatically at a specified interval. Specified data stored in the specified storage area may be transferred timely, which is favorable for timely efficient data storage when new data are to be stored in the terminal equipment.

In an example, it may be determined in step S101 whether the size of the available storage space in the first storage area in the terminal equipment is smaller than the first threshold, as follows. When detecting that data are to be stored in the first storage area, the terminal equipment may determine the size of the available storage space in the first storage area, and determine whether the size of the available storage space in the first storage area is smaller than the first threshold.

In the aspect, when it is detected that new data are to be stored in the terminal equipment, the size of the available storage space may be detected. That is, when new data are to be stored, specified data stored in the terminal equipment may be transferred to allow enough storage space in the terminal equipment be reserved for storing the new data.

In step S102, when the size of the available storage space in the first storage area is smaller than the first threshold, data stored in the first storage area that meet a preset condition are determined.

Figure 2:
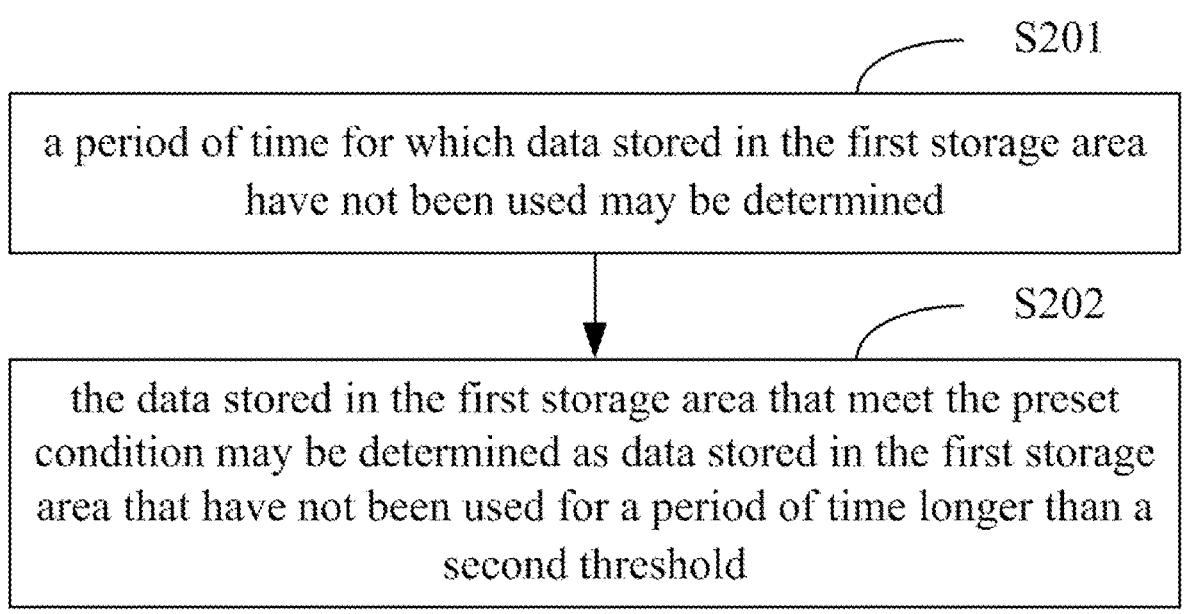
FIG. 2 is a flowchart of determining data stored in the first storage area that meet a preset condition in step S102 of the method for processing data according to an exemplary aspect of the present disclosure.

FIG. 2 is a flowchart of determining data stored in the first storage area that meet a preset condition in step S102 of the method for processing data according to an exemplary aspect. As shown in FIG. 2, the data stored in the first storage area that meet the preset condition may be determined as follows.

In step S201, a period of time for which data stored in the first storage area have not been used may be determined.

In step S202, the data stored in the first storage area that meet the preset condition may be determined as data stored in the first storage area that have not been used for a period of time longer than a second threshold.

In a possible mode of implementation, the second threshold may be a preset numerical value, such as 2 months, 3 months, and/or the like.

In an example, the terminal equipment may determine the data stored in the first storage area that meet the preset condition as part of the data stored in the first storage area that have not been used for a period of time longer than the second threshold. For example, if the second threshold is 2 months, the terminal equipment may determine the data stored in the first storage area that meet the preset condition as any video file in the first storage area that has not been watched for a period of time no shorter than 2 months.

In an example, the terminal equipment may determine the data stored in the first storage area that meet the preset condition as all of the data stored in the first storage area that have not been used for a period of time longer than the second threshold. For example, if the second threshold is 2 months, the terminal equipment may determine the data stored in the first storage area that meet the preset condition as all data (such as any picture file, any video file, any text file, any executable file, etc.) in the first storage area that have not been used for a period of time no shorter than 2 months.

In the aspect, data in storage space that have not been used for a specified period of time, that is, data most unlikely to be used by a user, may be transferred. Thus, data may be transferred with minimal impact on normal use of the terminal equipment by the user.

Figure 3:
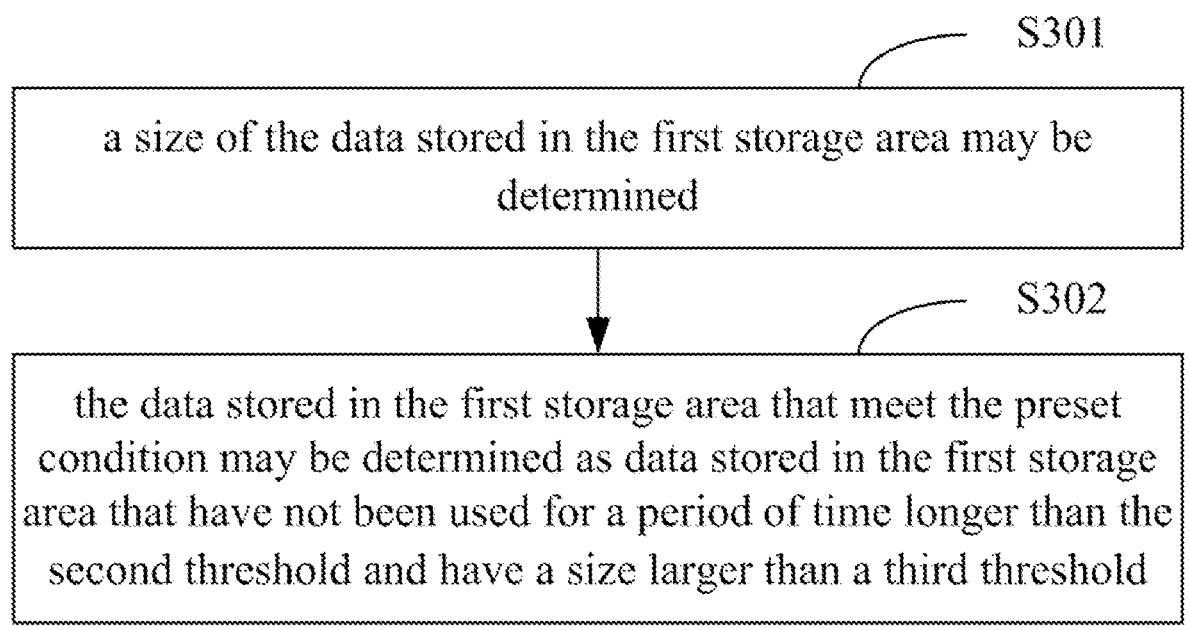
FIG. 3 is a flowchart of determining the data stored in the first storage area that meet the preset condition as data stored in the first storage area that have not been used for a period of time longer than a second threshold in step S202 of the method for processing data according to an exemplary aspect of the present disclosure.

FIG. 3 is a flowchart of determining the data stored in the first storage area that meet the preset condition as data stored in the first storage area that have not been used for a period of time longer than a second threshold in step S202 of the method for processing data according to an exemplary aspect. As shown in FIG. 3, the data stored in the first storage area that meet the preset condition may be determined as the data stored in the first storage area that have not been used for a period of time longer than the second threshold, as follows.

In step S301, a size of the data stored in the first storage area may be determined.

In step S302, the data stored in the first storage area that meet the preset condition may be determined as data stored in the first storage area that have not been used for a period of time longer than the second threshold and have a size larger than a third threshold.

In a possible mode of implementation, the third threshold may be preset data, such as 1 GB, 2 GB, and/or the like.

In a possible mode of implementation, the data stored in the first storage area that have not been used for a period of time longer than the second threshold may be determined first. Then, the data stored in the first storage area that have not been used for a period of time longer than the second threshold and have a size larger than the third threshold may be determined.

In a possible mode of implementation, data stored in the first storage area that have a size larger than the third threshold may be determined first. Then, the data stored in the first storage area that have a size larger than the third threshold and have not been used for a period of time longer than the second threshold may be determined.

In an example, the terminal equipment may determine the data stored in the first storage area that meet the preset condition as part of the data stored in the first storage area that have not been used for a period of time longer than the second threshold and have a size larger than the third threshold. For example, if the second threshold is 2 months and the third threshold is 1 GB, the terminal equipment may determine the data stored in the first storage area that meet the preset condition as any video file that has not been watched for at least 2 months and has a size larger than 1 GB.

In an example, the terminal equipment may determine the data stored in the first storage area that meet the preset condition as all of the data stored in the first storage area that have not been used for a period of time longer than the second threshold and have a size larger than the third threshold. For example, if the second threshold is 2 months and the third threshold is 200M, the terminal equipment may determine the data stored in the first storage area that meet the preset condition as all of the data (such as any picture file, any video file, any text file, any executable file, etc.) in the first storage area that have not been used for at least 2 months and have a size larger than 200M.

In the aspect, the data stored in the first storage area that meet the preset condition may be determined as the data stored in the first storage area that have not been used for a period of time longer than the second threshold and have a size larger than the third threshold. Thus, data that have not been used for a long time and occupy much memory may be transferred such that more available space in a specified storage area in the terminal equipment may be reserved with no impact on normal use of the terminal equipment by the user.

Note that although the data stored in the first storage area that meet the preset condition have been introduced as the data stored in the first storage area that have not been used for a period of time longer than the second threshold or as the data stored in the first storage area that have not been used for a period of time longer than the second threshold and have a size larger than the third threshold, those skilled in the art will know that the present disclosure is not limited as such. Those skilled in the art may flexibly set the data stored in the first storage area that meet the preset condition as needed in a practical scene of application.

In step S103, the data stored in the first storage area that meet the preset condition are transferred to a second storage area. The second storage area is not the first storage area.

In a possible mode of implementation, the second storage area may be a mobile hard disk, a network hard disk, or a storage area in the terminal equipment other than the first storage area. The hard disk may refer to a portable storage product with a hard disk as a storage medium. The network hard disk may refer to a storage product that provides the user with a function such as file storage, access, backup, sharing, etc., through a network. The second storage area may also be a cloud server. A form of the second storage area is not limited herein.

As an example of the mode of implementation, the second storage area may be a mobile hard disk. The data stored in the first storage area that meet the preset condition may be transferred to the second storage area in step 103 as follows. The data stored in the first storage area that meet the preset condition may be transferred to the mobile hard disk when it is detected that the terminal equipment is connected to the mobile hard disk.

As an example of the mode of implementation, the second storage area may be a network hard disk. The data stored in the first storage area that meet the preset condition may be transferred to the second storage area in step 103 as follows. The data stored in the first storage area that meet the preset condition may be transferred to the network hard disk when it is detected that the terminal equipment is connected to the network hard disk.

As an example of the mode of implementation, the second storage area may be a storage area in the terminal equipment other than the first storage area. The data stored in the first storage area that meet the preset condition may be transferred to the second storage area in step 103 as follows. The data stored in the first storage area that meet the preset condition may be transferred to the second storage area in the terminal equipment. For example, if the first storage area is a disk E in the terminal equipment and the second storage area is a disk F in the terminal equipment, data stored in the disk E that meet the preset condition may be transferred to the F disk.

Note that although the second storage area has been introduced as a mobile hard disk, a network hard disk, or a storage area in the terminal equipment other than the first storage area, those skilled in the art will know that the present disclosure is not limited as such. Those skilled in the art may flexibly set the second storage area as needed in a practical scene of application.

In a possible mode of implementation, the method may further include steps as follows. Before step S103, the terminal equipment may display a first prompting message prompting the user of a name of the data to be transferred to the second storage area. In a possible mode of implementation, the method may further include steps as follows. After step S103, the terminal equipment may display a second prompting message prompting the user of a name of data having been transferred to the second storage area. The name of the data may be the name of a file, such as the name of a picture file or a video file.

Note that when the user is to view data having been transferred, if the data are still stored in the memory, the user may directly open and view the data. If the data have been deleted, the user has to connect the terminal equipment to the mobile hard disk to acquire the data stored in the mobile hard disk, or connect the terminal equipment to a wireless local area network to acquire the data stored in the network hard disk.

With the method for processing data according to the aspect, when the size of the available storage space in the first storage area is smaller than the first threshold, the data stored in the first storage area that meet the preset condition are transferred to the second storage area, such that more available storage space in the first storage area may be recovered timely and conveniently without requiring any manual operation by the user to select data to be transferred, simplifying an operating flow, improving user experience.

Figure 4:
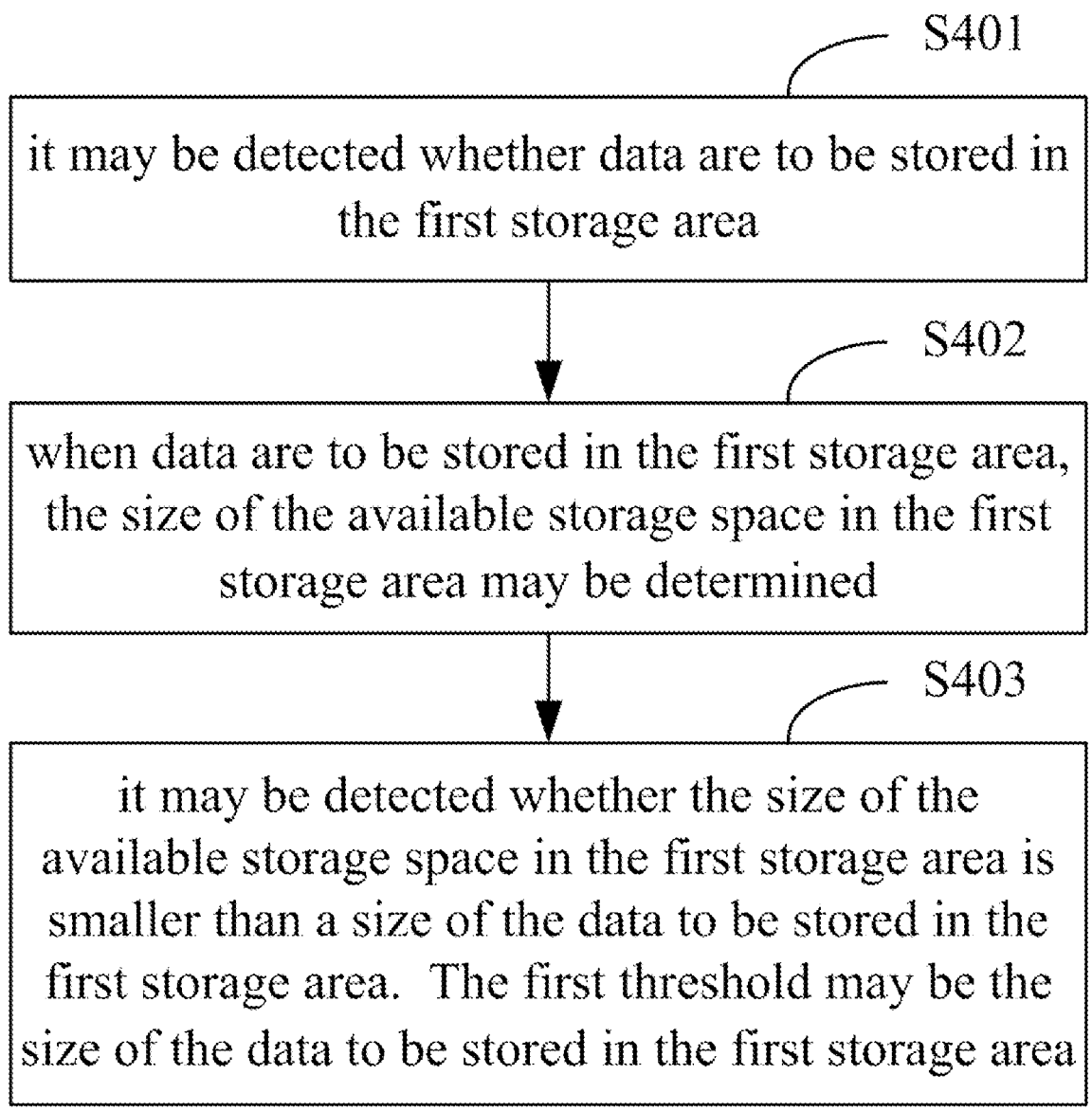
FIG. 4 is a flowchart of step S101 of the method for processing data according to an exemplary aspect of the present disclosure.

FIG. 4 is a flowchart of step S101 of the method for processing data according to an exemplary aspect. As shown in FIG. 4, it may be determined whether the size of the available storage space in the first storage area in the terminal equipment is smaller than the first threshold as follows.

In step S401, it may be detected whether data are to be stored in the first storage area.

In step S402, when data are to be stored in the first storage area, the size of the available storage space in the first storage area may be determined.

In step S403, it may be detected whether the size of the available storage space in the first storage area is smaller than a size of the data to be stored in the first storage area. The first threshold may be the size of the data to be stored in the first storage area.

In a possible mode of implementation, the first threshold may be the size of the data to be stored in the first storage area.

Note that those skilled in the art will know that the data to be stored in the first storage area may not be loaded into the first storage area in case the available storage space in the first storage area is insufficient, that is, the size of the available storage space in the first storage area is smaller than the size of the data to be stored in the first storage area. For example, the size of the available storage space in the first storage area is 500M. The user attempts downloading a video of 800M to the first storage area. The terminal equipment may detect that the available storage space in the first storage area is insufficient, leading to a failure of the download.

According to the method for processing data of the aspect, when it is detected that data are to be stored in the first storage and the size of the available storage space in the first storage area is smaller than the size of the data to be stored in the first storage, the data stored in the first storage area that meet the preset condition may be transferred to the second storage area, such that more available storage space in the first storage area may be recovered timely and conveniently without requiring any manual operation by the user to select data to be transferred, simplifying an operating flow, improving user experience.

Figure 5:
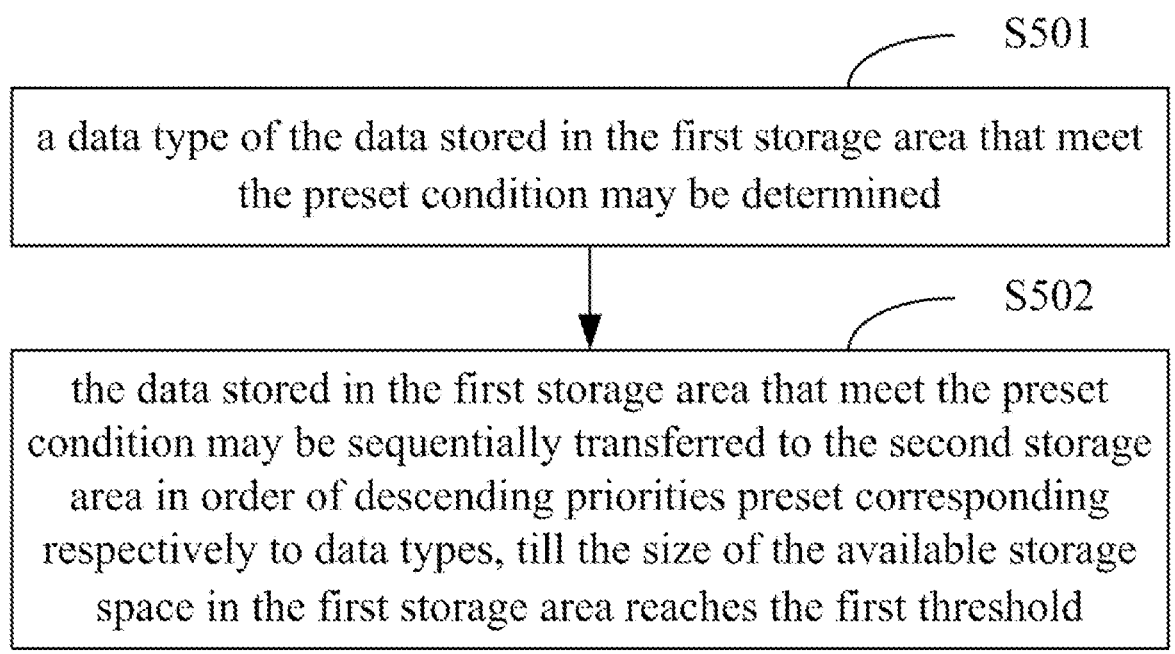
FIG. 5 is a flowchart of step S103 of the method for processing data according to an exemplary aspect of the present disclosure.

FIG. 5 is a flowchart of step S103 of the method for processing data according to an exemplary aspect. As shown in FIG. 5, the data stored in the first storage area that meet the preset condition may be transferred to the second storage area as follows.

In step S501, a data type of the data stored in the first storage area that meet the preset condition may be determined.

A type of a file may be determined through an extension of the file. For example, a file with an extension such as bmp, jpg, gif, etc., may be a picture file. A file with an extension such as mpeg, dat, mp4, etc., may be a video file. A file with an extension such as doc, docx, txt, etc., may be a text file. A file with an extension such as exe, sys, com, etc., may be an executable file.

In step S502, the data stored in the first storage area that meet the preset condition may be sequentially transferred to the second storage area in order of descending priorities preset corresponding respectively to data types, till the size of the available storage space in the first storage area reaches the first threshold.

The priorities for data transfer may be a preset sequence for transferring different types of data. For example, a picture file, a video file, a text file and an executable file may be transferred sequentially according to the priorities for data transfer.

In a possible mode of implementation, of the data stored in the first storage area that meet the preset condition, any picture file may be stored in the second storage area first, then any video file may be stored in the second storage area, then any text file may be stored in the second storage area, and finally any executable file may be stored in the second storage area, till the size of the available storage space in the first storage area reaches the first threshold.

Note that those skilled in the art will know that during transferring the data stored in the first storage area that meet the preset condition, when the size of the available storage space in the first storage area reaches the first threshold, transfer of the data stored in the first storage area that meet the preset condition may be stopped or may continue, which is not limited herein.

A device for processing data according to an aspect herein is configured for executing the method for processing data.

Figure 6:
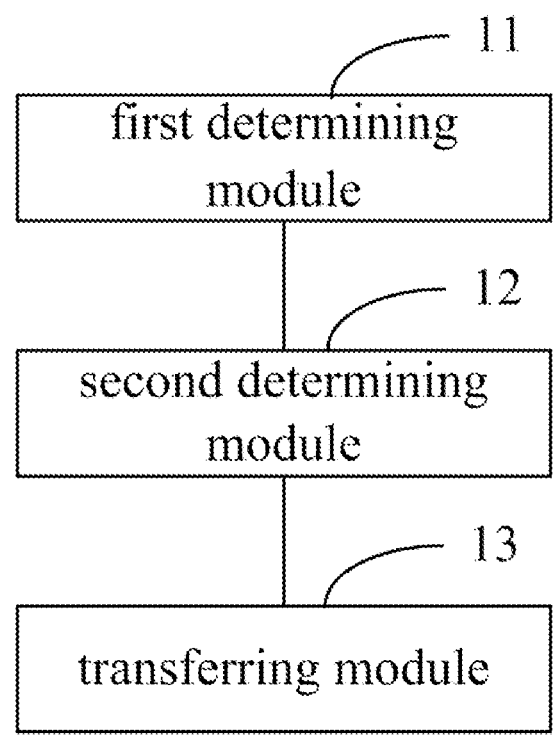
FIG. 6 is a block diagram of a device for processing data according to an exemplary aspect of the present disclosure.

FIG. 6 is a block diagram of a device for processing data according to an exemplary aspect. Referring to FIG. 6, the device includes a first determining module 11, a second determining module 12, and a transferring module 13.

The first determining module 11 is configured for: determining whether a size of available storage space in a first storage area in terminal equipment is smaller than a first threshold. The second determining module 12 is configured for: in response to determining that the size of the available storage space in the first storage area is smaller than the first threshold, determining data stored in the first storage area that meet a preset condition. The transferring module 13 is configured for: transferring the data stored in the first storage area that meet the preset condition to a second storage area. The second storage area is not the first storage area.

Figure 7:
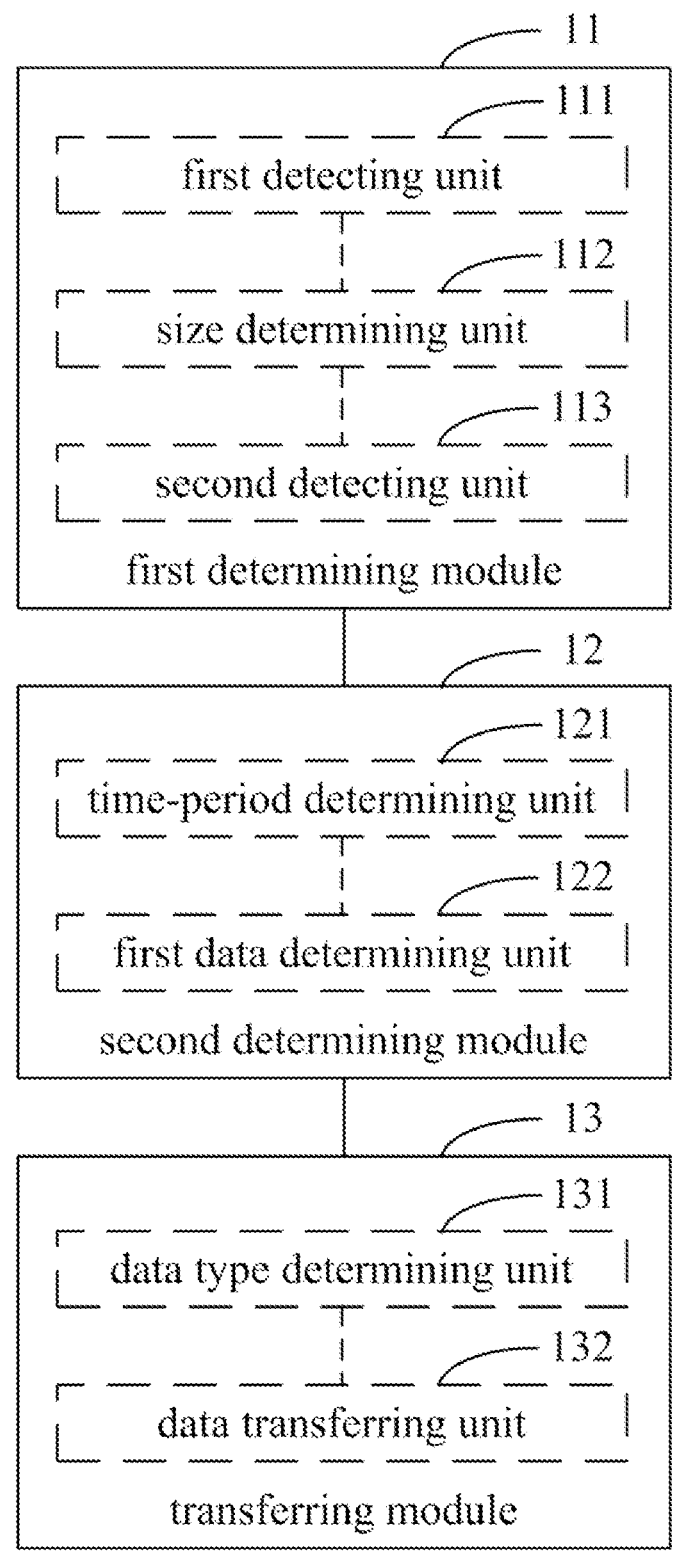
FIG. 7 is a block diagram of a device for processing data according to an exemplary aspect of the present disclosure.

FIG. 7 is a block diagram of a device for processing data according to an exemplary aspect.

In a possible mode of implementation, the second determining module 12 may include a time-period determining unit 121 and a first data determining unit 122.

The time-period determining unit 121 may be configured for determining a period of time for which data stored in the first storage area have not been used. The first data determining unit 122 may be configured for determining the data stored in the first storage area that meet the preset condition as data stored in the first storage area that have not been used for a period of time longer than a second threshold.

In a possible mode of implementation, the first data determining unit 122 may include a size determining subunit and a second data determining subunit.

The size determining subunit may be configured for determining a size of the data stored in the first storage area. The second data determining subunit may be configured for determining the data stored in the first storage area that meet the preset condition as data stored in the first storage area that have not been used for a period of time longer than the second threshold and have a size larger than a third threshold.

In a possible mode of implementation, the first determining module 11 may include a first detecting unit 111, a size determining unit 112, and a second detecting unit 113.

The first detecting unit 111 may be configured for detecting whether data are to be stored in the first storage area. The size determining unit 112 may be configured for, in response to determining that data are to be stored in the first storage area, determining the size of the available storage space in the first storage area a. The second detecting unit 113 may be configured for detecting whether the size of the available storage space in the first storage area is smaller than a size of the data to be stored in the first storage area. The first threshold may be the size of the data to be stored in the first storage area.

In a possible mode of implementation, the transferring module 13 may include a data type determining unit 131 and a data transferring unit 132.

The data type determining unit 131 may be configured for determining a data type of the data stored in the first storage area that meet the preset condition. The data transferring unit 132 may be configured for sequentially transferring the data stored in the first storage area that meet the preset condition to the second storage area in order of descending priorities preset corresponding respectively to data types, till the size of the available storage space in the first storage area reaches the first threshold.

A module or unit of the device according to the aspect may execute an operation in a mode elaborated in an aspect of the method, which will not be repeated here.

With the device for processing data according to the aspect, when the size of the available storage space in the first storage area is smaller than the first threshold, the data stored in the first storage area that meet the preset condition are transferred to the second storage area, such that more available storage space in the first storage area may be recovered timely and conveniently without requiring any manual operation by the user to select data to be transferred, simplifying an operating flow, improving user experience.

According to an aspect herein, a device for processing data includes:

a processor; and memory for storing instructions executable by the processor.

The processor is configured for:

determining whether a size of available storage space in a first storage area in terminal equipment is smaller than a first threshold;

in response to determining that the size of the available storage space in the first storage area is smaller than the first threshold, determining data stored in the first storage area that meet a preset condition; and transferring the data stored in the first storage area that meet the preset condition to a second storage area. The second storage area is not the first storage area.

With the device for processing data according to the aspect, when the size of the available storage space in the first storage area is smaller than the first threshold, the data stored in the first storage area that meet the preset condition are transferred to the second storage area, such that more available storage space in the first storage area may be recovered timely and conveniently without requiring any manual operation by the user to select data to be transferred, simplifying an operating flow, improving user experience.

Figure 8:
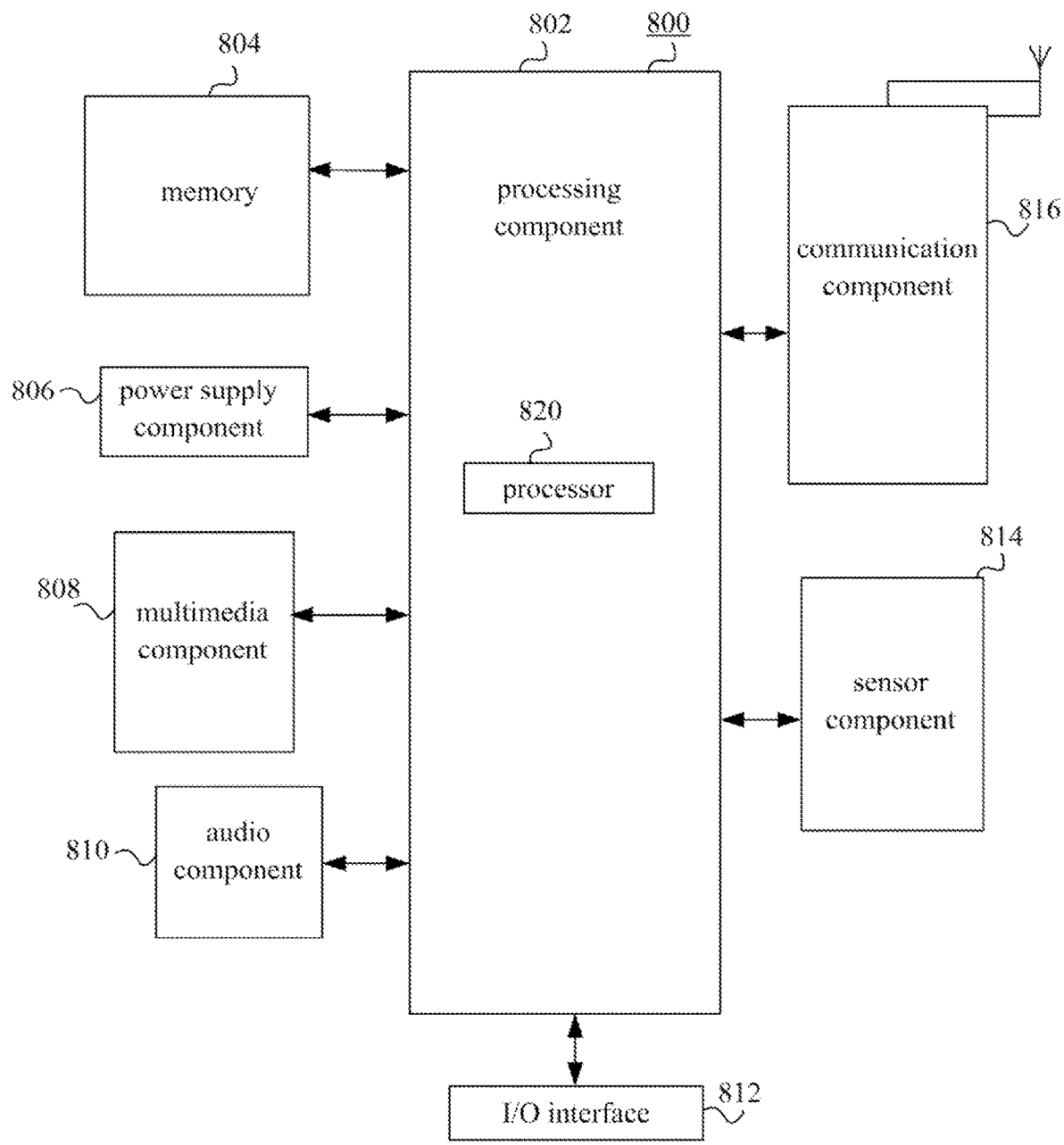
FIG. 8 is a block diagram of a device 800 for processing data according to an exemplary aspect of the present disclosure.

FIG. 8 is a block diagram of a device 800 for processing data according to an exemplary aspect. For example, the device 800 may be a mobile phone, a computer, a digital broadcasting terminal or UE, a message transceiver, a game console, tablet equipment, medical equipment, fitness equipment, a personal digital assistant, and/or the like.

Referring to FIG. 8, the device 800 may include one or more components as follows: a processing component 802, a memory 804, a power supply component 806, a multimedia component 808, an audio component 810, an Input/Output (I/O) interface 812, a sensor component 814, and a communication component 816.

The processing component 802 generally controls an overall operation of the device 800, such as operations associated with display, a telephone call, data communication, a camera operation, and a recording operation. The processing component 802 may include one or more processors 820 to execute instructions so as to complete all or some steps of the method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 may be configured to store various types of data to support the operation at the device 800. Example of such data may include instructions of any application or method configured to operate on the device 800, contact data, phonebook data, messages, pictures, videos, and/or the like. The memory 804 may be realized by any type of transitory or non-transitory storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power supply component 806 may supply electric power to various components of the device 800. The power supply component 806 may include a power management system, one or more power sources, and other components related to generating, managing and distributing electricity for the device 800.

The multimedia component 808 may include a screen providing an output interface between the device 800 and a user. In some aspects, the screen may include a Liquid Crystal Display (LCD) and a Touch Panel (TP). If the screen includes a TP, the screen may be realized as a touch screen to receive an input signal from a user. The TP may include one or more touch sensors for sensing touch, slide and gestures on the TP. The touch sensors not only may sense the boundary of a touch or slide move, but also detect the duration and pressure related to the touch or slide move. In some aspects, the multimedia component 808 may include a front camera and/or a rear camera. When the device 800 is in an operation mode such as a shooting mode or a video mode, the front camera and/or the rear camera may receive external multimedia data. Each of the front camera and the rear camera may be a fixed optical lens system or may have a focal length and be capable of optical zooming.

The audio component 810 may be configured to output and/or input an audio signal. For example, the audio component 810 may include a microphone (MIC). When the device 800 is in an operation mode such as a call mode, a recording mode, and a voice recognition mode, the MIC may be configured to receive an external audio signal. The received audio signal may be further stored in the memory 804 or may be sent via the communication component 816. In some aspects, the audio component 810 may further include a loudspeaker configured to output the audio signal.

The I/O interface 812 may provide an interface between the processing component 802 and a peripheral interface module. Such a peripheral interface module may be a keypad, a click wheel, a button, and/or the like. Such a button may include but is not limited to at least one of: a homepage button, a volume button, a start button, and a lock button.

The sensor component 814 may include one or more sensors for assessing various states of the device 800. For example, the sensor component 814 may detect an on/off state of the device 800 and relative positioning of components such as the display and the keypad of the device 800. The sensor component 814 may further detect a change in the position of the device 800 or of a component of the device 800, whether there is contact between the device 800 and a user, the orientation or acceleration/deceleration of the device 800, and/or a change in the temperature of the device 800. The sensor component 814 may include a proximity sensor configured to detect existence of a nearby object without physical contact. The sensor component 814 may further include an optical sensor such as a Complementary Metal-Oxide-Semiconductor (CMOS) or Charge-Coupled-Device (CCD) image sensor used in an imaging application.

In some aspects, the sensor component 814 may further include an acceleration sensor, a gyroscope sensor, a magnetic sensor, a pressure sensor, and/or a temperature sensor.

The communication component 816 may be configured to facilitate wired or wireless communication between the device 800 and other equipment. The device 800 may access a wireless network based on a communication standard such as WiFi, 2G or 3G, or combination thereof. In an exemplary aspect, the communication component 816 may receive a broadcast signal or broadcast related information from an external broadcast management system via a broadcast channel. In an exemplary aspect, the communication component 816 may further include a Near Field Communication (NFC) module for short-range communication. For example, the NFC module may be based on Radio Frequency Identification (RFID), Infrared Data Association (IrDA), Ultra-Wideband (UWB) technology, Bluetooth (BT), and/or other technologies.

In an exemplary aspect, the device 800 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors and/or other electronic components, to implement the method.

In an exemplary aspect, a non-transitory computer-readable storage medium including instructions, such as a memory 804 including instructions, may be provided. The instructions may be executed by the processor 820 of the device 800 to implement the method. For example, the non-transitory computer-readable storage medium may be a Read-Only Memory (ROM), a Compact Disc Read-Only Memory (CD-ROM), a magnetic tape, a floppy disk, optical data storage equipment, and/or the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects herein will be apparent to those skilled in the art from consideration of the present disclosure and practice of the disclosure disclosed here. This application is intended to cover any variation, use, or adaptation of the present disclosure following the general principle herein and including such departures from the present disclosure as come within known or customary practice in the art. The present disclosure and its aspects are intended to be exemplary only, with a true scope and spirit of the present disclosure being indicated by the appended claims.

Note that the present disclosure is not limited to the exact construction that has been described above and illustrated in the accompanying drawings, and that various modifications and changes can be made without departing from the scope thereof. It is intended that the scope of the present disclosure be limited only by the appended claims.

The invention claimed is:

1. A method for processing data, comprising:
   determining a size of available storage space in a first storage area in a terminal equipment;
   comparing the size of the available storage space in the first storage area to a first threshold;
   determining that the size of the available storage space in the first storage area is less than the first threshold;
   in response to determining that the size of the available storage space in the first storage area is less than the first threshold, determining data stored in the first storage area that meet a preset condition as data to be transferred to a second storage area;
displaying a name of the data to be transferred to the second storage area;
transferring the data stored in the first storage area that meet the preset condition to the second storage area, wherein the second storage area is different from the first storage area; and
displaying the name of the data having been transferred to the second storage area.

2. The method of claim 1, wherein determining the data stored in the first storage area that meet the preset condition comprises:
determining a period of time during which data stored in the first storage area have not been used;
comparing the period of time to a second threshold;
determining that the period of time is greater than the second threshold; and
determining the data stored in the first storage area that meet the preset condition as data stored in the first storage area that have not been used for the period of time that is greater than the second threshold.

3. The method of claim 2, wherein determining the data stored in the first storage area that meet the preset condition as the data stored in the first storage area that have not been used for the period of time that is greater than the second threshold comprises:
determining a size of the data stored in the first storage area;
comparing the size of the data to a third threshold;
determining that the size of the data is greater than the third threshold; and
determining the data stored in the first storage area that meet the preset condition as the data stored in the first storage area that have not been used for the period of time that is greater than the second threshold and have the size that is greater than the third threshold.

4. The method of claim 1, wherein determining the size of the available storage space in the first storage area comprises:
determining whether data are to be stored in the first storage area;
in response to determining that the data are to be stored in the first storage area, determining the size of the available storage space in the first storage area; and
determining a size of the data that are to be stored in the first storage area, wherein the first threshold is the size of the data to be stored in the first storage area.

5. The method of claim 1, wherein transferring the data stored in the first storage area that meet the preset condition to the second storage area comprises:
determining a data type of the data stored in the first storage area that meet the preset condition; and
sequentially transferring the data stored in the first storage area that meet the preset condition to the second storage area in order of descending priorities corresponding to data types until the size of the available storage space in the first storage area reaches the first threshold.

6. A device for processing data, comprising:
circuitry configured to:
determine a size of available storage space in a first storage area in a terminal equipment;
compare the size of the available storage space in the first storage area to a first threshold;
determine that the size of the available storage space in the first storage area is less than the first threshold;
in response to determining that the size of the available storage space in the first storage area is less than the first threshold, determine data stored in the first storage area that meet a preset condition as data to be transferred to a second storage area;
display a name of the data to be transferred to the second storage area;
transfer the data stored in the first storage area that meet the preset condition to the second storage area, wherein the second storage area is different from the first storage area; and
display the name of the data having been transferred to the second storage area.

7. The device of claim 6, wherein the circuitry is further configured to:
determine a period of time during which data stored in the first storage area have not been used;
compare the period of time to a second threshold;
determine that the period of time is greater than the second threshold; and
determine the data stored in the first storage area that meet the preset condition as data stored in the first storage area that have not been used for the period of time that is greater than the second threshold.

8. The device of claim 7, wherein the circuitry is further configured to:
determine a size of the data stored in the first storage area;
compare the size of the data to a third threshold;
determine that the size of the data is greater than the third threshold; and
determine the data stored in the first storage area that meet the preset condition as the data stored in the first storage area that have not been used for the period of time that is greater than the second threshold and have the size that is greater than the third threshold.

9. The device of claim 6, wherein the circuitry is configured to:
determine whether data are to be stored in the first storage area;
in response to determining that the data are to be stored in the first storage area, determine the size of the available storage space in the first storage area;
determine a size of the data that are to be stored in the first storage area, wherein the first threshold is the size of the data to be stored in the first storage area.

10. The device of claim 6, wherein the circuitry is further configured to:
determine a data type of the data stored in the first storage area that meet the preset condition; and
sequentially transfer the data stored in the first storage area that meet the preset condition to the second storage area in order of descending priorities corresponding to data types until the size of the available storage space in the first storage area reaches the first threshold.

11. A device for processing data, comprising:
a processor; and
a memory for storing instructions executable by the processor,
wherein the processor is configured to:
determine a size of available storage space in a first storage area in a terminal equipment;
compare the size of the available storage space in the first storage area to a first threshold;
determine that the size of the available storage space in the first storage area is less than the first threshold;
in response to determining that the size of the available storage space in the first storage area is less than the first threshold, determine data stored in the first storage area that meet a preset condition as data to be transferred to a second storage area;

display a name of the data to be transferred to the second storage area;

transfer the data stored in the first storage area that meet the preset condition to the second storage area, wherein the second storage area is different from the first storage area; and display the name of the data having been transferred to the second storage area.

12. A non-transitory computer-readable storage medium having stored therein instructions that, when executed by a processor, cause the processor to:

determine a size of available storage space in a first storage area in a terminal equipment;

compare the size of the available storage space in the first storage area to a first threshold;

determine that the size of the available storage space in the first storage area is less than the first threshold;

in response to determining that the size of the available storage space in the first storage area is less than the first threshold, determine data stored in the first storage area that meet a preset condition as data to be transferred to a second storage area;

display a name of the data to be transferred to the second storage area;

transfer the data stored in the first storage area that meet the preset condition to the second storage area, wherein the second storage area is different from the first storage area; and display the name of the data having been transferred to the second storage area.

* * * * *